United States Patent
Egi

(10) Patent No.: US 10,926,411 B2
(45) Date of Patent: Feb. 23, 2021

(54) CONTROL SYSTEM

(71) Applicant: OMRON Corporation, Kyoto (JP)

(72) Inventor: Mamoru Egi, Otsu (JP)

(73) Assignee: OMRON Corporation, Kyoto (JP)

(*) Notice: Subject to any disclaimer, the term of this patent is extended or adjusted under 35 U.S.C. 154(b) by 0 days.

(21) Appl. No.: 16/485,785

(22) PCT Filed: Jan. 30, 2018

(86) PCT No.: PCT/JP2018/002905
§ 371 (c)(1),
(2) Date: Aug. 13, 2019

(87) PCT Pub. No.: WO2018/168229
PCT Pub. Date: Sep. 20, 2018

(65) Prior Publication Data
US 2020/0061831 A1 Feb. 27, 2020

(30) Foreign Application Priority Data
Mar. 14, 2017 (JP) .............................. JP2017-048069

(51) Int. Cl.
*B25J 9/16* (2006.01)
*G05B 13/04* (2006.01)
*G05D 3/12* (2006.01)

(52) U.S. Cl.
CPC .......... *B25J 9/1671* (2013.01); *G05B 13/042* (2013.01); *G05D 3/12* (2013.01)

(58) Field of Classification Search
CPC ...... B25J 9/1671; G05B 13/042; G05B 13/04; G05D 3/12
See application file for complete search history.

(56) References Cited

U.S. PATENT DOCUMENTS 5,402,333 A * 3/1995 Cardner ............... G05B 13/042
700/31
5,623,402 A * 4/1997 Johnson ................. G05B 13/04
700/42

(Continued)

FOREIGN PATENT DOCUMENTS

JP S61190604 8/1986
JP 2005094964 4/2005

(Continued)

OTHER PUBLICATIONS

"International Search Report (Form PCT/ISA/210) of PCT/JP2018/002905," dated Apr. 10, 2018, with English translation thereof, pp. 1-4.

(Continued)

*Primary Examiner* — Ziaul Karim
(74) *Attorney, Agent, or Firm* — JCIPRNET

(57) ABSTRACT

A control system includes a drive-side control device and a host-side control device. The drive-side control device has a drive-side control structure including a drive-side feedback system and a drive-side control model part and configured so as to be capable of model tracking control in accordance with a control model which the drive-side control model part has. The host-side control device has a host-side control structure including a host-side control model part a host-side correcting signal based on a deviation between an output of the host-side control model part and the operation command signal is fed back to an input side of the host-side control model part, and a corrected command signal generated based on the host-side correcting signal that is fed back and the operation command signal is input to the host-side control model part. The corrected command signal is further input to the drive-side control structure.

7 Claims, 6 Drawing Sheets

(56) References Cited

U.S. PATENT DOCUMENTS

| | | | |
|---|---|---|---|
| 6,900,607 B2 * | 5/2005 | Kleinau | B62D 5/0496 |
| | | | 180/446 |
| 9,757,834 B2 * | 9/2017 | Nagaoka | B23Q 3/18 |
| 2009/0143871 A1 * | 6/2009 | Gao | G05B 13/04 |
| | | | 700/29 |
| 2016/0282846 A1 | 9/2016 | Nagaoka | |

FOREIGN PATENT DOCUMENTS

| | | |
|---|---|---|
| JP | 2006015431 | 1/2006 |
| JP | 2009116817 | 5/2009 |
| JP | 2012104047 | 5/2012 |
| JP | 5340486 | 11/2013 |
| JP | 2015115990 | 6/2015 |
| WO | 2013140679 | 9/2013 |

OTHER PUBLICATIONS

"Written Opinion of the International Searching Authority (Form PCT/ISA/237) of PCT/JP2018/002905," dated Apr. 10, 2018, with English translation thereof, pp. 1-8.
Okyay Kaynak et al., "Model predictive heuristic control of a position servo system in robotics application", IEEE Journal on Robotics and Automation, Oct. 1, 1987, pp. 481-485.
"Search Report of Europe Counterpart Application", dated Nov. 20, 2020, p. 1-p. 10.

\* cited by examiner

CONTROL SYSTEM

CROSS-REFERENCE TO RELATED APPLICATION

This application is a 371 application of the international PCT application serial no. PCT/JP2018/002905, filed on Jan. 30, 2018, which claims the priority benefit of Japan application no. 2017-048069, filed on Mar. 14, 2017. The entirety of each of the abovementioned patent applications is hereby incorporated by reference herein and made a part of this specification.

BACKGROUND

Technical Field

The invention relates to a control system including a drive-side control device driving a control target and a host-side control device providing an operation command signal to the drive-side control device.

Description of Related Art

In order to move a control target to track a target trajectory, it is common to use feedback control. For example, in a multi-articulated robot, the servomotor of each joint shaft is controlled by a control device of the robot, so that feedback control is used and the position of a hand tip part of the robot tracks a preset (taught) target trajectory. However, in the general feedback control, since each servomotor inevitably has a response delay, an issue that the actual trajectory of the robot is deviated from the target trajectory may arise. Regarding this issue, a technique which adopts feed-forward control and controls to make the position of the robot always consistent with a command position has been disclosed. For example, in the technology disclosed in Patent Document 1, in the control of a multi-articulated robot driven by a plurality of motors, the tracking capability of the target trajectory is increased by estimating a future position from the current position by using a predetermined position model and correcting a current position command with the deviation between the estimated position and the target trajectory, that is, an error amount of a direction vertical to the target trajectory.

In addition, in the case where the future position is estimated by using the position model as the above, if the trajectory properties of the actual control target change significantly, such as a case where arc movement is switched from linear movement, the precision of such estimation is not necessarily favorable, and it becomes difficult to properly correct the position command. Therefore, the technology of Citation 2 aims at increasing the trajectory tracking capability in correspondence with the variation of trajectory properties by correcting the position command by using information relating to the boundary point position of the shape of the target trajectory (command path) and a movement direction in the vicinity thereof.

RELATED ART DOCUMENT(S)

Patent Document(s)

Patent Document 1: Japanese Laid-Open No. 2006-15431
Patent Document 2: Japanese Patent No. 5340486
Patent Document 3: Japanese Laid-Open No. S61-190604

SUMMARY

Problems to be Solved

In the conventional technologies above, a position model is used to estimate the future position, and the correction amount of a position command responsive to the deviation between the estimated position and the target trajectory is calculated. In addition, to correct the position command, a predetermined delay process is performed with respect to the original position command. The delay amount according to the delay process should be properly set even for determining an appropriate correction amount and requires an adjustment responsive to the properties of the control target. Therefore, in order to attain suitable trajectory tracking capability, it is necessary for the user to adjust the delay time based on the actual control target.

In other words, if the adjustment to the delay time is not sufficient, it is not easy to realize an effective improvement to the trajectory tracking capability.

The invention is made in view of such issue, and aims at providing a control system which includes a drive-side control device driving the control target and a host-side control device providing an operation command signal to the drive-side control device and realizes effective trajectory tracking capability of the control target while suppressing the adjustment load of the user as much as possible.

Means for Solving the Problems

In the invention, in order to solve the above issue, a configuration in which, in a host-side control device included in a control system, a host-side control model modeling a drive-side feedback system of a drive-side control device is disposed, and an operation command signal reflecting the drive-side feedback system and a control target is corrected by using the host-side control device is adopted. According to such configuration, effective trajectory tracking capability of the control target can be realized.

Specifically, the invention provides a control system including a drive-side control device driving a control target and a host-side control device generating an operation command signal for driving control of the control target by the drive-side control device. In addition, the drive-side control device includes: a drive-side control structure which includes a drive-side feedback system including one or more controllers to which a feedback signal associated with an operation of the control target is input and a drive-side control model part having a control model modeling the drive-side feedback system and the control target, and is configured so as to be capable of model tracking control in accordance with the control model which the drive-side control model part has; and a drive-side calculating part performing a calculating process of a predetermined signal for driving control of the control target in the drive-side control structure. The host-side control device includes: a host-side control structure which includes a host-side control model part at least having a control model corresponding to the drive-side control model part and is configured such that a host-side correcting signal based on a deviation between an output of the host-side control model part and the operation command signal is fed back to an input side of the host-side control model part, and a corrected command signal generated based on the host-side correcting signal that is fed back and the operation command signal is input to the host-side control model part; and a host-side calculating part which performs a calculating process of a predetermined signal for driving control of the control target in the host-side control structure. The corrected command signal is further input to the drive-side control structure.

The control system of the invention includes the drive-side control device and the host-side control device. The operation command signal is corrected by the host-side control device and is provided as the corrected command signal to the drive-side control device. In the drive-side control device, based on the drive-side control structure including the drive-side feedback system and the drive-side control model part, the calculating process of the predetermined signal for the driving control of the control target is performed by the drive-side calculating part. Accordingly, in the drive-side control device, the so-called model tracking control in accordance with the control model which the drive-side control model part has is realized. Here, the host-side control structure of the host-side control device includes the host-side control model part having the control model corresponding to the drive-side control model part. In addition, in the host-side control structure, a feedback structure in which the output of the host-side control model part is fed back to the input side thereof is formed. In addition, since the deviation between the output of the host-side control model part that is fed back and the operation command signal means the deviation between the output of the control target in the model and the goal, the tracking capability with respect to the operation command signal can be increased by using the host-side correcting signal based on the deviation to correct the operation command signal. For example, the host-side correcting signal and the operation command signal are added, and the corrected command signal as the corrected operation command signal is generated.

In addition, such corrected command signal is input to the drive-side control structure configured to be capable of the model tracking control as described above. Therefore, in the tracking driving control to the operation command signal, the drive-side control device does not directly use the operation command signal, but uses the result of the correction of the operation command signal in the host-side control model, that is, the result of correction reflecting the drive-side feedback system and the control target, which is the corrected command signal, and realizes the model tracking control. As a result, according to the drive-side control device, the driving control of the control target with increased tracking capability with respect to the operation command signal can be realized. In addition, to configure the control system of the invention, it only requires to prepare the host-side control model in the host-side control device, so the convenience of the user is very high. Moreover, the correction of the operation command signal is performed through the feedback structure formed by the host-side control structure of the host-side control device. Therefore, since it is not necessary to adjust the predetermined control parameter in the case of estimating the future position to increase the trajectory tracking capability as in the conventional technologies, the invention makes favorable contribution to increase the convenience of the user. In addition, since the feedback system is not formed across the host-side control device and the drive-side control device, the deterioration of the trajectory tracking capability due to communication time between devices can be suppressed.

Here, in the control system, it may also be that the control model which the host-side control model part has and the control model which the drive-side control model part has are the same control model. By doing so, the control model of the host-side control model part can be easily prepared. In addition, even if such control model is applied to the host-side control model part, since the drive-side control structure is configured as being capable of model tracking control, the increase in tracking capability with respect to the operation command signal can be sufficiently enjoyed.

Here, regarding the control system, it may also be that the host-side control device further includes a model parameter acquiring part acquiring a predetermined control parameter relating to the host-side control model part from the drive-side control device based on a control parameter of the drive-side control model part which the drive-side control device has. The host-side control model part disposed in the host-side control device and the drive-side control model part disposed in the drive-side control device both model the drive-side feedback system and the control target. While it is not necessary that the models which the two model parts have are consistent, in the case where the two models are entirely or partially consistent, the predetermined control parameters forming the two models can be shared. Therefore, with the model parameter acquiring part of the host-side control device acquiring the predetermined control parameter for forming the host-side control model part from the drive-side control device, preparation of the host-side control model part in the host-side control device becomes easy. Besides, when the drive-side control device is connected with the host-side control device, the acquisition may be performed automatically or semi-automatically according to an instruction from the user. In addition, in the case where the control structure of the drive-side feedback system in the drive-side control device is changed, while reflecting the change in the drive-side control model part, the change of the control structure may also be reflected in the host-side driving device through acquiring the predetermined control parameter by the model parameter acquiring part.

Here, in the control system so far, it may also be that each of the host-side control model part and the drive-side control model part includes an impulse response model represented by impulse response information as information of an impulse response relating to the drive-side feedback system and the control target. In addition, the drive-side calculating part uses a result of a convolution integration process of an input to the impulse response model included in the drive-side control model part and the impulse response model to perform a calculating process of the predetermined signal in the drive-side control structure, and the host-side calculating part uses a result of a convolution integration process of an input to the impulse response model included in the host-side control model part and the impulse response model to perform a calculating process of the predetermined signal in the host-side control structure. By using the impulse response information in this manner, the actual properties of the control target and the drive-side feedback system can be reflected, and the predetermined signals in the drive-side control structure and the host-side control structure can be more accurately calculated.

In addition, in the control system so far, it may also be that the drive-side control device has a plurality of drive-side control structures which exert driving control on a plurality of control targets and respectively correspond to the control targets, and the host-side control device has a plurality of host-side control structures including the host-side control model part corresponding to each of the control targets. In addition, in this case, a predetermined control gain in the host-side control model part of each of the host-side control structures is set to a common value across all the host-side control model parts, and a predetermined control gain in the drive-side control model part of each of the drive-side control structures is set to a common value across all the drive-side control model parts. That is, in the case where the drive-side control device and the host-side control device exert driving control on the plurality of control targets, the above configuration is adopted to apply the technical concept of the invention. According to such configuration, the tracking capability of each control target with respect to the operation command signal is increased, and by setting the predetermined control gain to the common value across all the host-side control model parts and setting the predetermined control gain to the common value across all the drive-side control model parts as well, the correction of the operation command signal to each control target in the host-side control device and the model tracking control of each control target in the drive-side control device are performed in the same way. Therefore, the synchronicity among the control targets is increased while the tracking capability of the control targets with respect to the operation command signals is increased. As a result, the outputs according to the driving control of the control targets become outputs very similar to the target trajectory.

Effects of Invention

In the control system which includes the drive-side control device driving the control target and the host-side control device providing the operation command signal to the drive-side control device, effective trajectory tracking capability for the control target is realized while suppressing the adjustment load of the user as much as possible.

DESCRIPTION OF THE EMBODIMENTS

Embodiment 1

Figure 1:
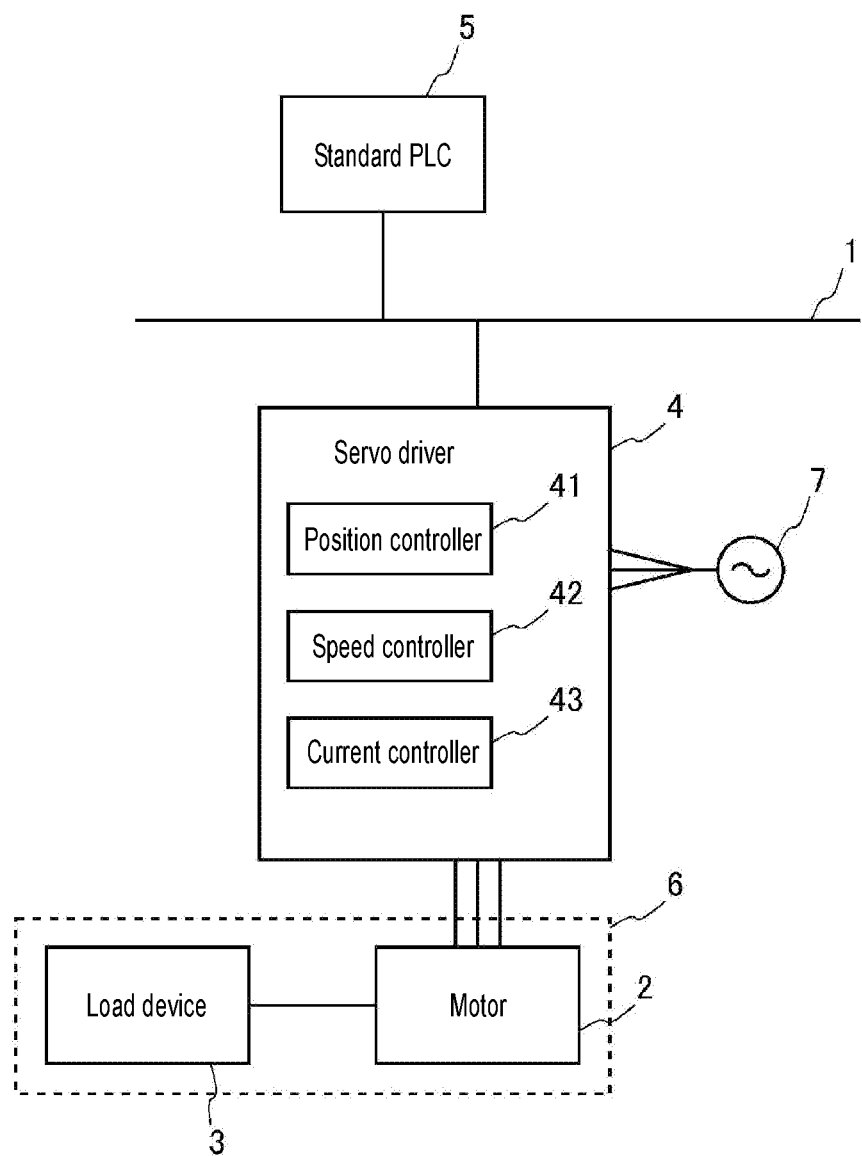
FIG. 1 is a diagram showing a schematic configuration of a control system according to the invention.

FIG. 1 is a diagram showing a schematic configuration of a control system according to an embodiment of the invention. The control system includes a network 1, a motor 2, a load device 3, a servo driver 4, and a standard programmable logic controller (PLC) 5. The control system is a system for the servo driver 4 to exert driving control on a control target 6, so that the motor 2 and the load device 3 as the control target 6 tracks an operation command signal pcmd generated by the standard PLC 5. Here, as the load device 3, various machinery devices (e.g., arms or transport devices of industrial robots) can serve as examples, and the motor 2 is incorporated into the load device 3 as an actuator driving the load device 3. For example, the motor 2 is an AC servo motor. An encoder not shown herein is installed in the motor 2, and a parameter signal relating to the operation of the motor 2 is feedback-transmitted to the servo driver 4 through the encoder. The feedback-transmitted parameter signal (referred to as feedback signal in the following) contains position information concerning a rotational position (angle) of a rotational shaft of the motor 2, information of rotational speed of the rotational shaft, etc., for example. The control target 6 may also include a plurality of motors 2. In such case, the load device 3 has a configuration of exerting driving control by the plurality of motors 2, that is, the so-called multi-axis configuration.

Figure 2:
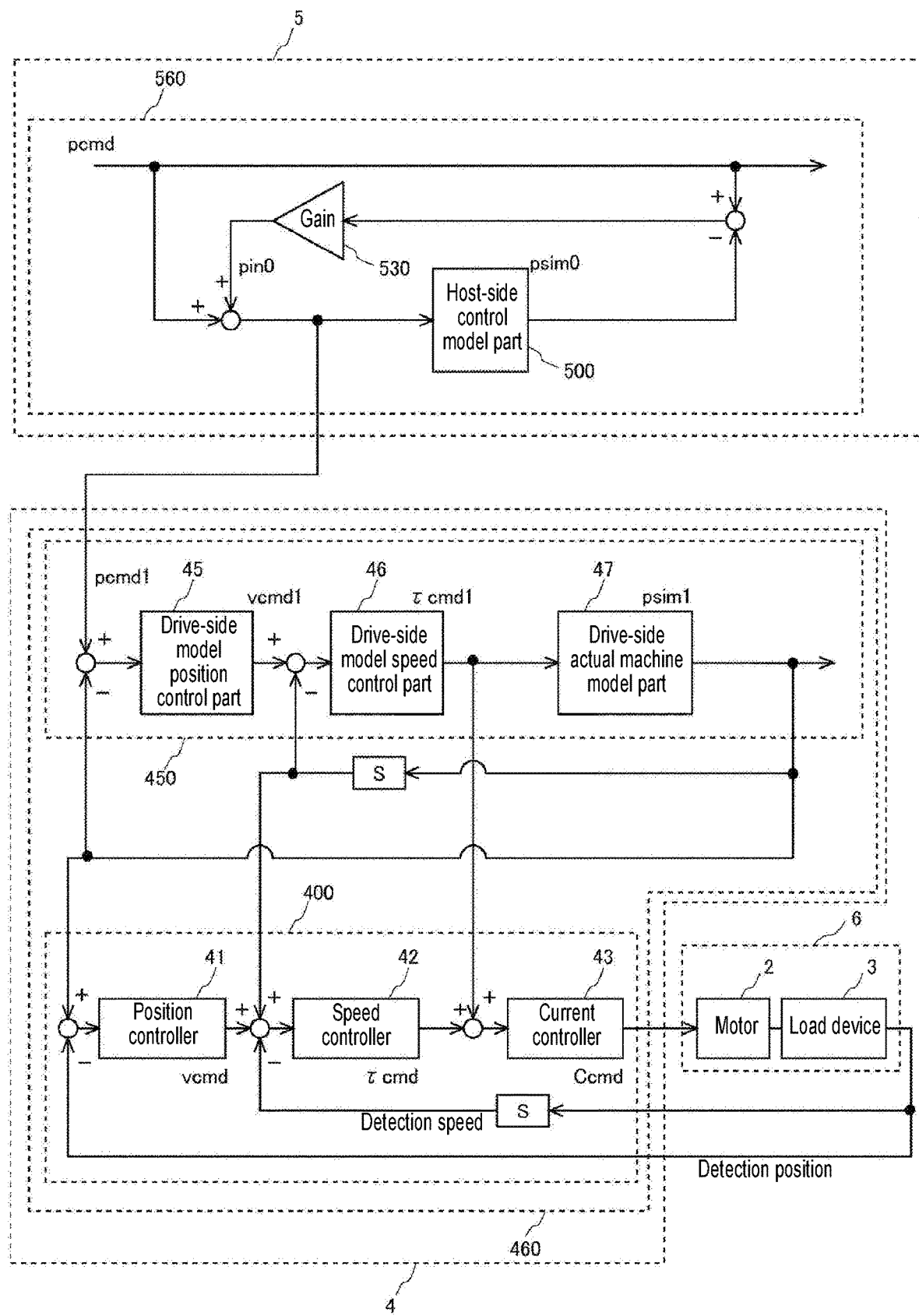
FIG. 2 is a diagram showing a first control structure formed across a servo driver and a standard PLC, which is a control structure of the control system shown in FIG. 1.

The standard PLC 5 generates an operation command signal relating to an operation (motion) of the motor 2, and transmits a signal after a correcting process to the servo motor 4 through a predetermined correcting process performed to the operation command signal by a host-side control model part 500 to be described in the following. The servo driver 4 receives a corrected command signal pcmd1 (as shown in FIG. 2), which is the operation command signal after the correcting process, from the standard PLC 5 via the network 1, and receives a feedback signal output from the encoder connected with the motor 2. Based on the corrected command signal pcmd1 from the standard PLC 5 and the feedback signal from the encoder, the servo driver 4 calculates servo control relating to driving of the motor 2, i.e., a command value relating to the operation of the motor 2, and supplies a driving current to the motor 2 so that the operation of the motor 2 tracks the command value. The AC power transmitted from the AC power 7 to the servo driver 4 is used as the supply current. While the servo driver 4 is of a type which receives three-phase AC in the embodiment, the servo driver 4 may also be of a type which receives single-phase AC. The servo control performed by the servo driver 4 is feedback control using a position controller 41, a speed controller 42, and a current controller 43 which the servo driver 4 has, and details in this regard will be described in the following based on FIG. 2.

Here, based on FIG. 2, the control structure of the control system shown in FIG. 1 is described. First of all, the control structure of the servo driver 4 in the control system is described. The servo driver 4 has a drive-side control structure 460 capable of the so-called model tracking control, and the drive-side control structure 460 includes a drive-side feedback system 400 and a drive-side control model part 450. The drive-side feedback system 400 includes the position controller 41, the speed controller 42, and the current controller 43. On the other hand, the drive-side control model part 450 includes a drive-side model position control part 45, a drive-side model speed control part 46, and a drive-side actual machine model part 47, which is a configuration modeling the controllers and the control target 6.

First of all, the drive-side feedback system 400 is described in detail. In the drive-side feedback system 400, the position controller 41, for example, performs proportional control (P control). Specifically, a speed command vcmd is calculated by multiplying a position deviation, which is a deviation between a drive-side model position output psim1 of the drive-side control model part 450 and a detection position, by a predetermined position proportional gain.

The speed controller 42, for example, performs proportional integral control (PI control). Specifically, an integral amount of a speed deviation, which is a deviation to a detection speed with respect to a sum of the speed command vcmd calculated by the position controller 41 and a speed output (a differential value of the drive-side model position output psim1) of the drive-side control model part 450, is multiplied by a predetermined speed integral gain, and a torque command τcmd is calculated by multiplying a sum of the calculation result and the speed deviation by a predetermined speed proportional gain. Also, the speed controller 42 may also perform P control to replace PI control.

The current controller 43 outputs a current command Ccmd based on a sum of the torque command τcmd calculated by the speed controller 42 and a drive-side model torque command τcmd1 calculated by the drive-side model speed control part 46 of the drive-side control model part 450, and exerts driving control on the motor 2 accordingly. The current controller 43 includes a filter relating to the torque command (a first-order low pass filter) or one or more notch filters, and, as a control parameter, has a cut-off frequency, etc., relating to properties of the filters.

In addition, the drive-side control model part 450 is described. In the drive-side control model part 450, the drive-side model position control part 45 models the position controller 41 of the drive-side feedback system 400 and performs P control like the position controller 41. Specifically, a drive-side model speed command vcmd1 is calculated by multiplying a deviation between a corrected command signal pcdm1 generated by a host-side control structure 560 to be described in the following and the drive-side model position output psim1 of the drive-side control model part 450 by a predetermined position proportional gain.

The drive-side model speed control part 46 models the speed controller 42 of the drive-side feedback system 400 and performs PI control like the speed controller 42. Specifically, an integral amount of a deviation between the drive-side model speed command vcmd1 calculated by the drive-side model position control part 45 and the speed output (the differential value of the drive-side model position output psim1) of the drive-side control model part 450 is multiplied by a predetermined speed integral gain, and a drive-side model torque command τcmd1 is calculated by multiplying a sum of the calculation result and the deviation by a predetermined speed proportional gain.

The drive-side actual machine model part 47 models the current controller 43 of the drive-side feedback system 400 and the control target 6, and outputs the drive-side model position output psim1 based on the drive-side model torque command τcmd1 calculated by the drive-side model speed control part 46.

In the drive-side control structure 460 including the drive-side feedback system 400 configured in this manner and the drive-side control model part 450, the so-called model tracking control structure is formed, that is, the drive-side feedback system 400 and the drive-side control model part 450 having the control structure modeling the control target 6 perform simulation on the control driving of the control target 6 and reflect the result to the drive-side feedback system 400. In the drive-side control structure 460 having the model tracking control structure, since a feedback loop of the drive-side feedback system 400 is configured to use the deviation with respect to the output of the drive-side control model part 450, instead of the deviation with respect to the operation command signal pcmd, the tracking capability with respect to the properties of the drive-side control model part 450 is increased. On the other hand, since the drive-side control model part 450 itself generally exhibits low-pass filter properties, when the operation command signal pcmd serves as basis, deviation may occur in a predetermined signal for tracking control in the drive-side control model part 450, and it becomes difficult to increase the trajectory tracking capability.

Therefore, a control structure for increasing the trajectory tracking capability is formed on the side of the standard PLC 5. The standard PLC 5 includes the host-side control structure 560 as a control structure, and the host-side control structure 560 includes a host-side control model part 500. The host-side control model part 500 has a control model corresponding to the drive-side control model part 450, and outputs a host-side position output psim0 that is a response result to its input.

Here, in the host-side control structure 560, a compensation, such as a gain, by a compensator 530 is made to a deviation between the operation command signal pcmd and the host-side position output psim0 from the host-side control model part 500, and a host-side correcting signal pin0 is generated. Since the host-side correcting signal pin0 is a deviation between a response position of the control target 6 estimated by the model which the host-side control model part 500 has and the operation command signal pcmd, the trajectory tracking capability relating to the driving control of the control target 6 can be increased by using the host-side correcting signal pin0 to correct the operation command signal pcmd. Therefore, the host-side correcting signal pin0 is added with the operation command signal pcmd, input to the host-side control model part 500, and transmitted as the corrected command signal pcmd1 to the side of the drive-side control model part 450. In addition, the deviation between the corrected command signal pcmd1 and the drive-side model position output psim1 is input to the drive-side model position control part 45.

In the control system in which the control structure is formed in this manner, in the standard PLC 5, the host-side control model part 500 corrects the operation command signal pcmd in a state of reflecting the control structure of the drive-side feedback system 400 and the control target 6 and generates the corrected command signal pcmd1. In addition, a feedback system is not formed across the standard PLC 5 and the servo driver 4, and the corrected command signal pcmd 1 is passed from the standard PLC 5 to the servo driver 4 without being affected by a delay. In addition, the servo driver 4 performs model tracking control by using the corrected command signal pcmd1. In the control system in which such control structure is formed, as a control system, high trajectory tracking capability with respect to the operation command signal pcmd can be realized through cooperation between the standard PLC 5 and the servo driver 4. In addition, since the generation of the corrected command signal pcmd1 in the standard PLC 5 follows the feedback structure in the host-side control structure 560, no special load for correcting the operation command signal pcmd is imposed on the user.

Figure 3:
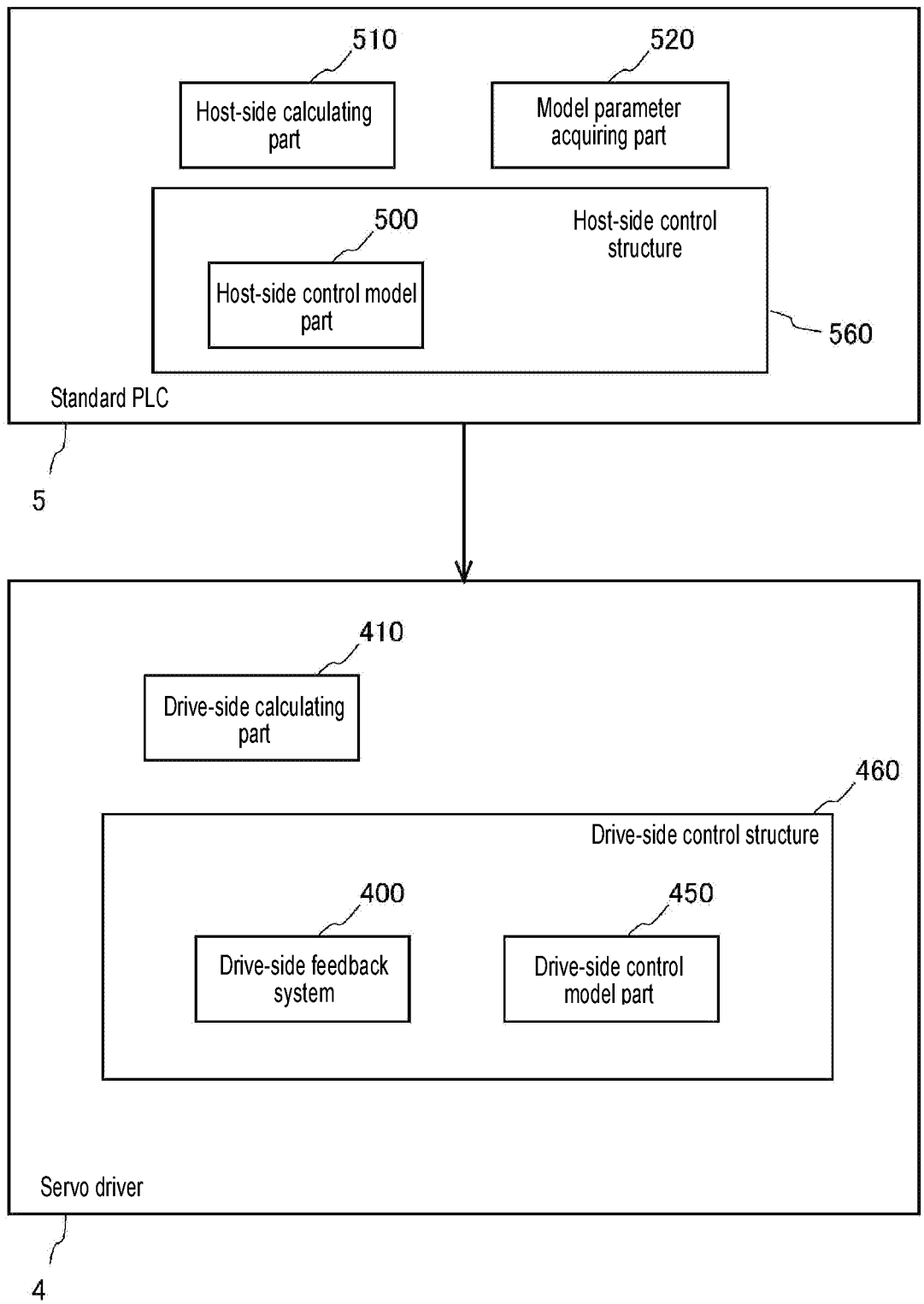
FIG. 3 is a functional block diagram of a servo driver and a standard PLC included in the control system shown in FIG. 1.

In addition, the functional structures of the servo driver 4 and the standard PLC 5 are described based on FIG. 3. FIG. 3 is a functional block diagram which represents by imaging various functions realized by software executed in the servo driver 4 and the standard PLC 5, respectively. Firstly, the servo driver 4 has the drive-side control structure 460 and a drive-side calculating part 410. In addition, as described above, the drive-side control structure 460 includes the drive-side feedback system 400 and the drive-side control model part 450. In addition, the drive-side calculating part 410 is a functional part that performs a calculating process of the predetermined signal for tracking control in the drive-side control structure 460 shown in FIG. 2. For example, the drive-side calculating part 410 calculates outputs of the position controller 41, the speed controller 42, the current controller 43, etc., in the drive-side feedback system 400, and calculates outputs of the drive-side model position control part 45, the drive-side model speed control part 46, and the drive-side real machine model part 47, etc., in the drive-side control model part 450.

In addition, the standard PLC 5 has the host-side control structure 560 as described above, a host-side calculating part 510, and a model parameter acquiring part 520. In addition, as described above, the host-side control structure 560 includes the host-side control model part 500. In addition, the host-side calculating part 510 is a functional part that performs a calculating process of a predetermined signal for tracking control in the host-side control structure 560 shown in FIG. 2. For example, the host-side calculating part 510 calculates the host-side position output psim0 of the host-side control model part 500 or generates the host-side correcting signal pin0 and the corrected command signal pcmd1, etc. The model parameter acquiring part 520 is a functional part that acquires a predetermined control parameter for forming the host-side control model part 500 from the side of the servo driver 4. As described above, the host-side control model part 500, like the drive-side control model part 450, models the drive-side feedback system 400 and the control target 6. Since the drive-side control model part 450 is formed in the servo driver 4 for model tracking control, a control parameter relating to the drive-side control model part 450 can be used in forming of the host-side control model part 500. Therefore, when the standard PLC 5 is electrically connected to the servo driver 4, the model parameter acquiring part 520 acquires the control parameter (the predetermined position proportional gain, speed proportional gain, speed integral gain, etc.) relating to the drive-side control model part 450 in the servo driver 4 to serve as the control parameter of the host-side control model part 500. Accordingly, the effort required to form the host-side control model part 500 in the standard PLC 5 is reduced. The acquisition by the model parameter acquiring part 520 may also be automatically performed when the structure of the drive-side control model part 450 in the servo driver 4 is changed.

Example 1 Relating to Trajectory Tracking Capability

Figure 4:
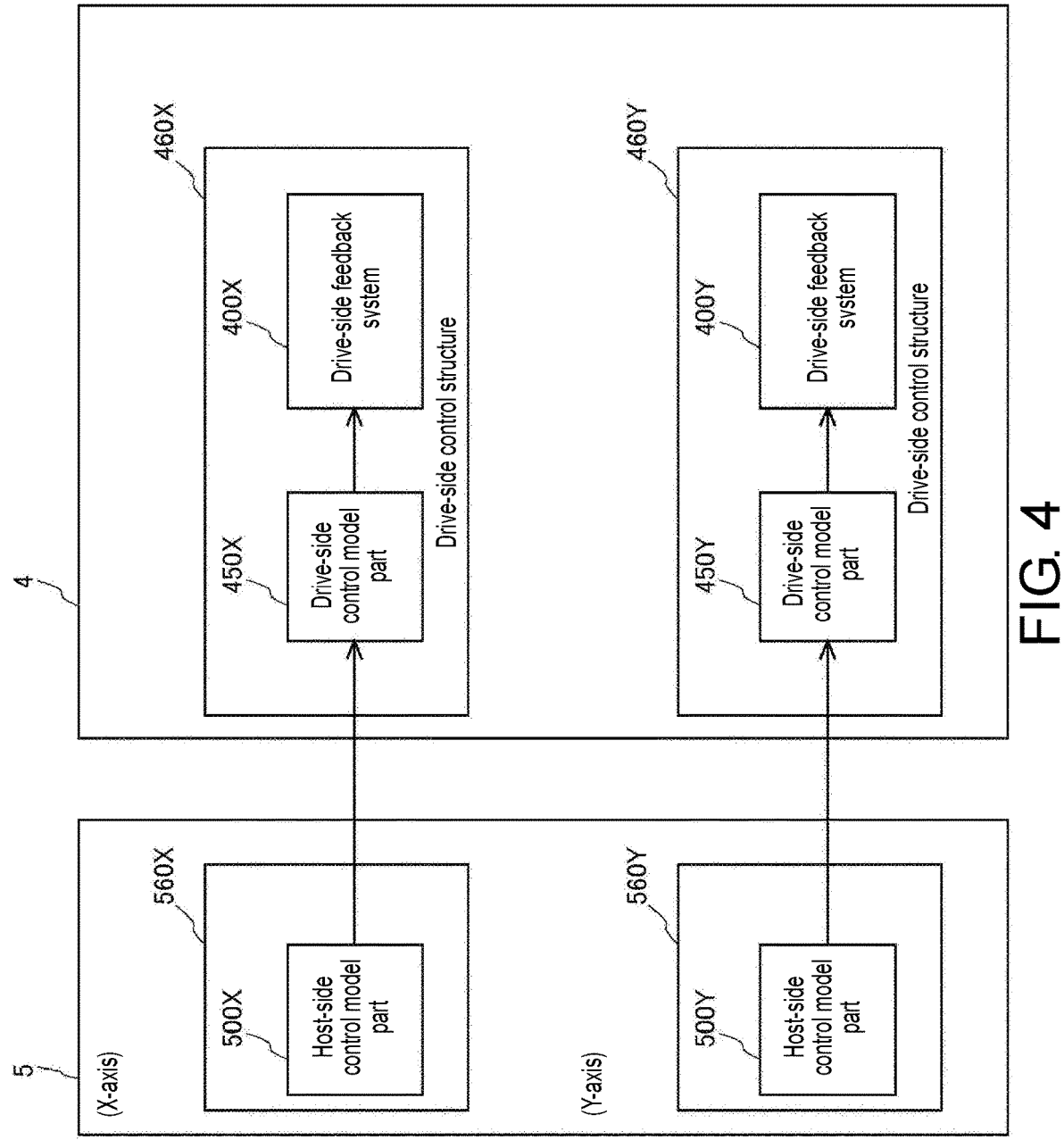
FIG. 4 is a first diagram schematically showing a control structure in the control system in the case where the control system exerts two-axis driving on a load device according to the invention.
Figure 5A:
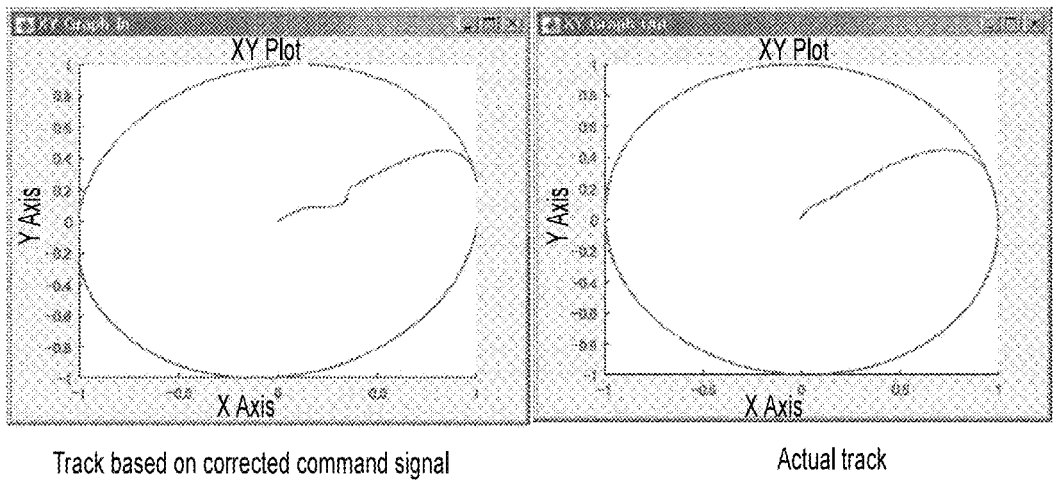
FIG. 5(a) and FIG. 5(b) are diagrams showing actual trajectory results of output positions of a load device subjected to two-axis driving in the case where the control structure shown in FIG. 4 is formed.
Figure 5B:
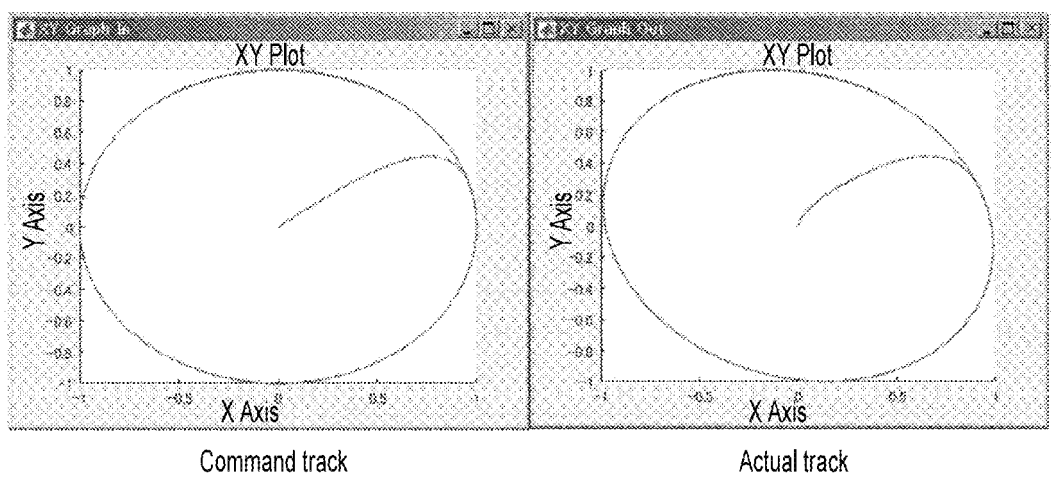

Here, the first example relating to the trajectory tracking capability in the case where two motors are synchronously controlled by the control system of the invention to drive the load device 3 is described based on FIGS. 4 and 5(*a*) and 5(*b*). As shown in FIG. 4, to correspond to the synchronous control of the two motors on X-axis and Y-axis, a drive-side control structure 460X for X-axis driving control and a drive-side control structure 460Y for Y-axis driving control are formed in the servo driver 4. In addition, the drive-side control structure 460X includes a drive-side feedback system 400X and a drive-side control model part 450X, and the drive-side control structure 460Y includes a drive-side feedback system 400Y and a drive-side control model part 450Y. Moreover, a host-side control structure 560X for X-axis driving control and a host-side control structure 560Y for Y-axis driving control are formed in the standard PLC 5, the host-side control structure 560X includes a host-side control model part 500X, and the host-side control structure 560Y includes the host-side control model part 500Y.

In the case of performing synchronous control of the motors in this manner, common values across the host-side control model parts are set for the values of the predetermined control gains, such as the position proportional gains, the speed proportional gains, and the speed integral gains, in the host-side control model parts 500X and 500Y, respectively. Moreover, common values across the drive-side control model parts are set for the predetermined control gains (similarly, the position proportional gain, the speed proportional gain, the speed integral gain, etc.) in the drive-side control model parts 450X and 450Y. The predetermined control gains (similarly, the position proportional gain, the speed proportional gain, the speed integral gain, etc.) in the drive-side feedback systems 400X and 400Y are not required to be set as common values across the axes. By setting such gains of the host-side control model parts 500X and 500Y and the drive-side control model parts 450X and 450Y, the tracking control is performed on the basis that the corrections with respect to the operation command signals pcmd of the respective axes of the standard PLC 5 are made to the same extent. Therefore, the synchronicity of the respective axes is increased, and the trajectory tracking capability of the load device 3 driven by synchronously controlling two motors is increased.

Here, the right side of FIG. 5 shows the actual track of the output part of the load device 3 in the case where the motors of the two axes are synchronously controlled so that the output part of the load device 3 draws a circle according to the control system shown in FIG. 4. The left side of FIG. 5(*a*) shows the track of the output part formed based on the corrected command signal passed from the standard PLC 5 to the servo driver 4. In addition, in FIG. 5(*b*), the correcting process for the operation command signal at the side of the standard PLC 5 as in the invention is not performed, but the track of the output part based on the operation command signal in the case where only the model tracking control is performed in the servo driver 4 is shown on the left side, while the actual track of the output part is shown on the right side. As can be learned from FIG. 5(*a*) and FIG. 5(*b*), even though a clear deviation can be identified between the actual track of the output part and the track based on the operation command signal in the case where only the model tracking control is performed in the servo driver 4, the deviation therebetween is favorably eliminated according to the control system shown in FIG. 4.

Embodiment 2

Figure 6:
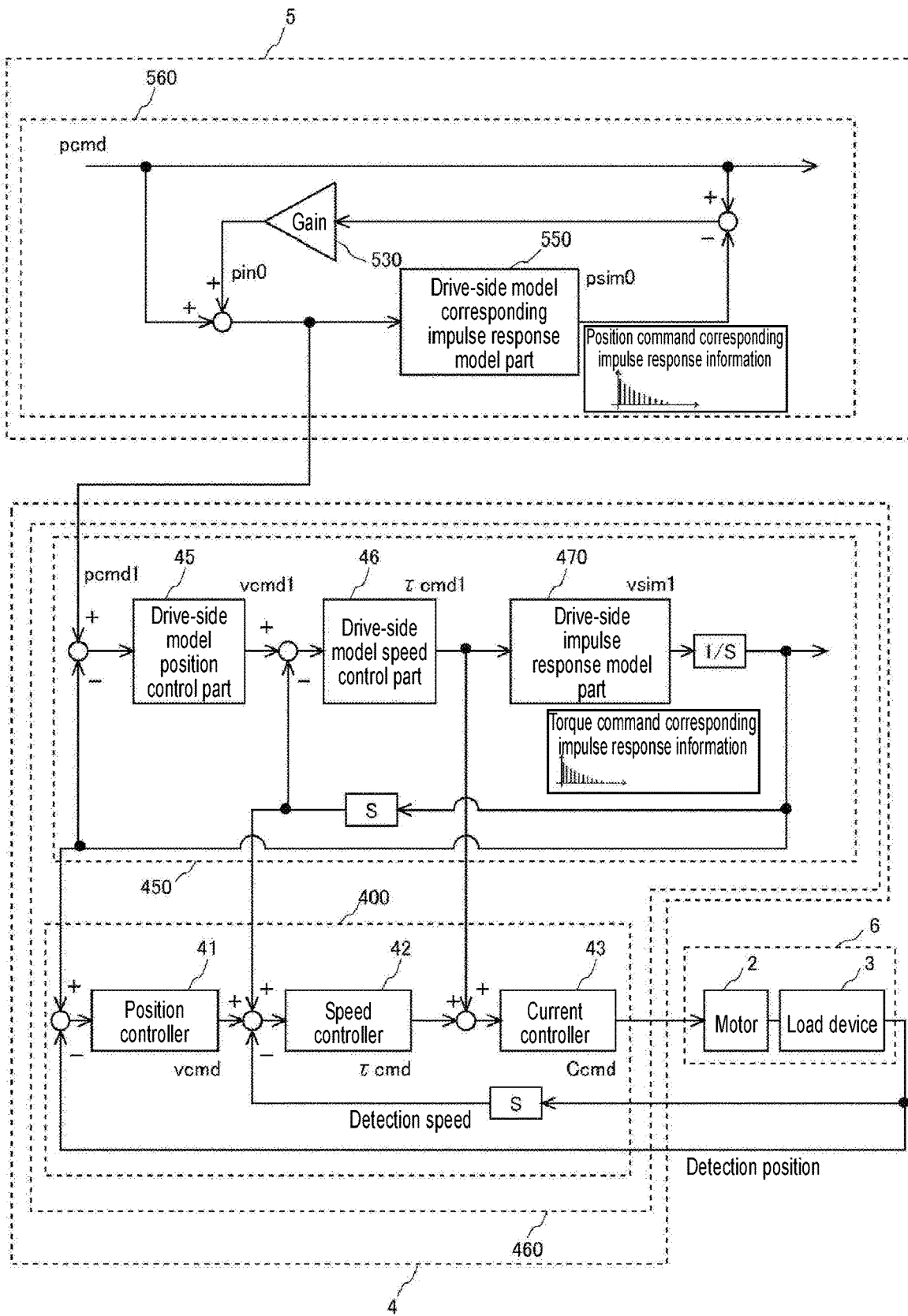
FIG. 6 is a diagram showing a second control structure formed across a servo driver and a standard PLC, which is a control structure of the control system shown in FIG. 1.

Based on FIG. 6, the control structure of the control system according to Embodiment 2 is described. FIG. 6 is a diagram showing a control structure of a control system, like FIG. 2. The configuration substantially the same as the configuration included in the control structure shown in FIG. 2 is referred to with the same reference symbol, and the detailed description thereof is omitted. The control structure shown in FIG. 6 has a drive-side impulse response model part 470 in place of the drive-side actual machine model part 47 of the drive-side control model part 450 included in the control structure shown in FIG. 2. In addition, the control structure shown in FIG. 6 has a drive-side model corresponding impulse response model part 550 in place of the host-side control model part 500 included in the control structure shown in FIG. 2.

In addition, the drive-side impulse response model part 470 has information relating to a speed response (a speed impulse response) at the time when an impulse signal is input to one machine configuration when the current controller 43 as a machine configuration on the side of the control system and the control target 6 are configured as the one machine configuration, the information serving as an impulse response model. The generation of the impulse response information can be realized by conventional technologies. In general, the generation of the impulse response information is realized by performing an inverse Fourier transform on a frequency transfer function relating to the drive-side actual machine model part 47. In addition, an output vsim1 with respect to an arbitrary input to the drive-side impulse response model part 470 can be calculated by a convolution integration process of the arbitrary input and the impulse response information which the drive-side impulse response model part 470 has. The convolution integration process is realized by the drive-side calculating part 410.

In addition, the drive-side model corresponding impulse response model 550 has information relating to a position response (a position impulse response) at the time when an impulse signal is input to one configuration when the drive-side control model part 450 is configured as the one configuration, and the information serves as an impulse response model. Alternatively, the impulse response model which the drive-side model corresponding impulse response model part 550 has may also be a model relating to a speed impulse response, like the impulse response model which the drive-side impulse response model part 470 has. In this case, the impulse response model of the drive-side impulse response model 470 may also be acquired from the servo motor 4 by the model parameter acquiring part 520 and used as the impulse response model of the drive-side model corresponding impulse response model part 550. In addition, an output (the host-side position output psim0) with respect to an arbitrary input to the drive-side model corresponding impulse response model part 550 can be calculated by a convolution integration process of the arbitrary input and the impulse response information which the drive-side model corresponding impulse response model part 550 has. The convolution integration process can be realized by the host-side calculating part 510.

By using the impulse response models in internal signal processes in the host-side control structure 560 and the drive-side control structure 460 in this manner, a speed response responsive to properties of the actual control target 6 can be accurately calculated. As a result, in the control system, through the cooperation between the standard PLC 5 and the servo driver 4, as the control system, the trajectory tracking capability with respect to the operation command signal pcmd can be further increased.

Modified Example

Regarding the control structures of the standard PLC 5 shown in FIGS. 2 and 6, the host-side control model part 500 may include a configuration that does not include the drive-side control model part 450. In addition, the host-side control model part 500 may also be configured to model the entirety of the control structure relating to model tracking control in the servo driver 4. In this case, while it is necessary to model the control target 6 in addition to the drive-side feedback system 400, as an example of the model, a low pass filter which uses cut-off frequency as the position control gain of the drive-side feedback system 400 may be used for replacement. In addition, regarding the control structures of the servo driver 4 shown in FIGS. 2 and 6, a control structure with only the drive-side feedback system 400 may also be adopted. In this case, the corrected command signal pcmd1 from the standard PLC 5 is input to the position controller 41 of the drive-side feedback system 400.

What is claimed is:
1. A control system, comprising:
a drive-side control device driving a control target; and
a host-side control device generating an operation command signal for driving control of the control target by the drive-side control device,
wherein the drive-side control device comprises:
a drive-side control structure which comprises a drive-side feedback system comprising one or more controllers to which a feedback signal associated with an operation of the control target is input, and a drive-side control model modeling the drive-side feedback system and the control target, the drive-side control structure is configured so as to be capable of model tracking control in accordance with the drive-side control model; and
a drive-side processor performing a calculating process of a predetermined signal for driving control of the control target in the drive-side control structure,
wherein the host-side control device comprises:
a host-side control structure which comprises a host-side control model corresponding to the drive-side control model and is configured such that a host-side correcting signal based on a deviation between an output of the host-side control model and the operation command signal is fed back to an input side of the host-side control model, and a corrected command signal generated based on the host-side correcting signal that is fed back and the operation command signal is input to the host-side control model; and
a host-side processor which performs a calculating process of a predetermined signal for driving control of the control target in the host-side control structure,
wherein the corrected command signal is further input to the drive-side control structure,
wherein the host-side control model is the same with the drive-side control model,
wherein the host-side processor is further configured to acquire a predetermined control parameter relating to the host-side control model from the drive-side control device based on a control parameter of the drive-side control model.

2. The control system as claimed in claim 1, wherein each of the host-side control model and the drive-side control model comprises an impulse response model represented by impulse response information as information of an impulse response relating to the drive-side feedback system and the control target,
the drive-side processor uses a result of a convolution integration process of an input to the impulse response model comprised in the drive-side control model and the impulse response model to perform a calculating process of the predetermined signal in the drive-side control structure,
the host-side processor uses a result of a convolution integration process of an input to the impulse response model comprised in the host-side control model and the impulse response model to perform a calculating process of the predetermined signal in the host-side control structure.

3. The control system as claimed in claim 2, wherein the drive-side control device has a plurality of drive-side control structures which exert driving control on a plurality of control targets and respectively correspond to the control targets,
the host-side control device has a plurality of host-side control structures comprising the host-side control model corresponding to each of the control targets,
a predetermined control gain in the host-side control model of each of the host-side control structures is set to a common value across all the host-side control models, a predetermined control gain in the drive-side control model of each of the drive-side control structures is set to a common value across all the drive-side control models.

4. The control system as claimed in claim 1, wherein the drive-side control device has a plurality of drive-side control structures which exert driving control on a plurality of control targets and respectively correspond to the control targets,
 the host-side control device has a plurality of host-side control structures comprising the host-side control model corresponding to each of the control targets,
 a predetermined control gain in the host-side control model of each of the host-side control structures is set to a common value across all the host-side control models,
 a predetermined control gain in the drive-side control model of each of the drive-side control structures is set to a common value across all the drive-side control models.

5. The control system as claimed in claim 1, wherein each of the host-side control model and the drive-side control model comprises an impulse response model represented by impulse response information as information of an impulse response relating to the drive-side feedback system and the control target,
 the drive-side processor uses a result of a convolution integration process of an input to the impulse response model comprised in the drive-side control model and the impulse response model to perform a calculating process of the predetermined signal in the drive-side control structure,
 the host-side processor uses a result of a convolution integration process of an input to the impulse response model comprised in the host-side control model and the impulse response model to perform a calculating process of the predetermined signal in the host-side control structure.

6. The control system as claimed in claim 1, wherein the drive-side control device has a plurality of drive-side control structures which exert driving control on a plurality of control targets and respectively correspond to the control targets,
 the host-side control device has a plurality of host-side control structures comprising the host-side control model corresponding to each of the control targets,
 a predetermined control gain in the host-side control model of each of the host-side control structures is set to a common value across all the host-side control models,
 a predetermined control gain in the drive-side control model of each of the drive-side control structures is set to a common value across all the drive-side control models.

7. The control system as claimed in claim 1, wherein the drive-side control device has a plurality of drive-side control structures which exert driving control on a plurality of control targets and respectively correspond to the control targets,
 the host-side control device has a plurality of host-side control structures comprising the host-side control model corresponding to each of the control targets,
 a predetermined control gain in the host-side control model of each of the host-side control structures is set to a common value across all the host-side control models,
 a predetermined control gain in the drive-side control model of each of the drive-side control structures is set to a common value across all the drive-side control models.

* * * * *